US012731339B2

(12) United States Patent
Edmond

(10) Patent No.: US 12,731,339 B2
(45) Date of Patent: Sep. 8, 2026

(54) OPTIMIZING VIEWS OF THREE-DIMENSIONAL ENTITIES FROM CLUSTERS OF PUBLIC, POSED IMAGES

(71) Applicant: Google LLC, Mountain View, CA (US)

(72) Inventor: Eric James Edmond, Redmond, WA (US)

(73) Assignee: GOOGLE LLC, Mountain View, CA (US)

( * ) Notice: Subject to any disclaimer, the term of this patent is extended or adjusted under 35 U.S.C. 154(b) by 318 days.

(21) Appl. No.: 18/491,216

(22) Filed: Oct. 20, 2023

(65) Prior Publication Data

US 2025/0131658 A1 Apr. 24, 2025

(51) Int. Cl.
*G06T 19/00* (2011.01)
*G06T 15/06* (2011.01)
*G06V 10/762* (2022.01)

(52) U.S. Cl.
CPC ............ *G06T 19/003* (2013.01); *G06T 15/06* (2013.01); *G06V 10/762* (2022.01)

(58) Field of Classification Search
None
See application file for complete search history.

(56) References Cited

U.S. PATENT DOCUMENTS 9,104,946 B2 * 8/2015 Dusberger ........... G06V 10/464
9,679,413 B2 * 6/2017 Xu .......................... G06T 17/00
11,176,189 B1 * 11/2021 Hohwald ............ G06F 16/5866
12,159,016 B1 * 12/2024 Agarwal ................. G06T 15/20
2008/0028341 A1 * 1/2008 Szeliski .............. G06F 3/04815 715/205
2011/0187716 A1 * 8/2011 Chen ....................... G06T 17/05 715/782
2012/0314040 A1 * 12/2012 Kopf .................... H04N 13/264 348/E13.074
2015/0178321 A1 * 6/2015 Rivlin .................. G06F 16/532 707/728
2019/0051050 A1 * 2/2019 Bell ........................ G06T 15/20
(Continued)

OTHER PUBLICATIONS

Chauhan, "DBSCAN Clustering Algorithm in Machine Learning", Machine Learning, Apr. 4, 2022, 12 pages.

*Primary Examiner* — Phong X Nguyen
(74) *Attorney, Agent, or Firm* — DORITY & MANNING P.A.

(57) ABSTRACT

A computing system obtains a plurality of images and associated image information. Each of the plurality of images depicts a particular Point of Interest (POI). For each of the plurality of images, the image information is descriptive of a plurality of image characteristics, such as a geolocation characteristic indicative of a geolocation at which the image was captured and/or an interaction metric derived from previous user interactions with the image. The computing system selects a particular image of the plurality of images based on the image information and generates a movement pattern for a camera viewpoint within a three-dimensional environment. The movement pattern for the camera viewpoint moves around a three-dimensional representation of the particular POI within the three-dimensional environment, and a starting position for the movement pattern is based, at least in part, on the geolocation at which the particular image was captured.

20 Claims, 9 Drawing Sheets

(56) References Cited

U.S. PATENT DOCUMENTS

2019/0130641 A1* 5/2019 Barajas Hernandez ..................... G06V 20/13
2019/0179796 A1* 6/2019 Lakhman ................. G06N 3/08
2021/0097667 A1* 4/2021 Barua .................... G06V 40/18
2021/0158618 A1* 5/2021 Bell ........................ G06T 13/80
2022/0083587 A1* 3/2022 Almog .................... G06F 16/58
2023/0079307 A1* 3/2023 Mildrew ................. G06T 15/20 715/740
2023/0080005 A1* 3/2023 Holzer ................... G06V 20/64 707/769
2023/0281913 A1* 9/2023 Rematas ................... G06T 7/55 345/419
2023/0306688 A1* 9/2023 Bell ........................ G06T 13/80
2024/0104831 A1* 3/2024 Lin ...................... G06V 10/762
2025/0131658 A1* 4/2025 Edmond ................. G06T 15/20

* cited by examiner

OPTIMIZING VIEWS OF THREE-DIMENSIONAL ENTITIES FROM CLUSTERS OF PUBLIC, POSED IMAGES

FIELD

The present disclosure relates generally to providing data for three-dimensional virtual environments. More particularly, the present disclosure relates to optimizing the data used to generate three-dimensional virtual environments.

BACKGROUND

As computing technology has improved, the number and type of services that can be provided to users has increased dramatically. The services provided via computer technology include providing data associated with displaying three-dimensional virtual environments. Such a service may provide data necessary to display three-dimensional environments based on contextual information associated with images, such as interaction metrics (e.g., metrics indicative of a degree of user interaction with a particular piece of content).

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method includes obtaining, by a computing system comprising one or more processor devices, a plurality of images and associated image information, each of the plurality of images depicting a particular Point of Interest (POI), the image information being descriptive of a plurality of image characteristics for each of the plurality of images. The plurality of image characteristics includes: (a) a geolocation characteristic indicative of a geolocation at which an image was captured; and (b) an interaction metric derived from previous user interactions with the image. The method further includes selecting, by the computing system, a particular image of the plurality of images based on the image information. The method further includes generating, by the computing system, a movement pattern for a camera viewpoint within a three-dimensional environment. The movement pattern for the camera viewpoint moves around a three-dimensional representation of the particular POI within the three-dimensional environment, and a starting position for the movement pattern is based, at least in part, on the geolocation at which the particular image was captured.

Another example aspect of the present disclosure is directed to a computing system. The computing system includes one or more processors. The computing system further includes one or more non-transitory computer-readable media collectively store instructions that, when executed by the one or more processors, cause the computing system to perform operations. The operations include obtaining a plurality of images and associated image information. Each of the plurality of images depicts a particular Point of Interest (POI), and the image information is descriptive of a plurality of image characteristics. The plurality of image characteristics include: (a) a geolocation characteristic indicative of a geolocation at which an image was captured; and (b) an interaction metric derived from previous user interactions with the image. The operations further include selecting a particular image of the plurality of images based on the image information. The operations further include generating a movement pattern for a camera viewpoint within a three-dimensional environment. The movement pattern for the camera viewpoint moves around a three-dimensional representation of the particular POI within the three-dimensional environment, and a starting position for the movement pattern is based, at least in part, on the geolocation at which the particular image was captured.

Another example aspect of the present disclosure is directed to a non-transitory computer-readable medium comprising instructions that, when executed by one or more processors of a computing device, cause the one or more processors to perform operations. The operations include obtaining a plurality of images and associated image information. Each of the plurality of images depicts a particular Point of Interest (POI), and the image information is descriptive of a plurality of image characteristics for each of the plurality of images. The plurality of image characteristics include: (a) a geolocation characteristic indicative of a geolocation at which an image was captured; and (b) an interaction metric derived from previous user interactions with the image. The operations further include selecting a particular image of the plurality of images based on the image information. The operations further include generating a movement pattern for a camera viewpoint within a three-dimensional environment. The movement pattern for the camera viewpoint moves around a three-dimensional representation of the particular POI within the three-dimensional environment, and a starting position for the movement pattern is based, at least in part, on the geolocation at which the particular image was captured.

Other aspects of the present disclosure are directed to various systems, apparatuses, non-transitory computer-readable media, user interfaces, and electronic devices.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Figure 1:
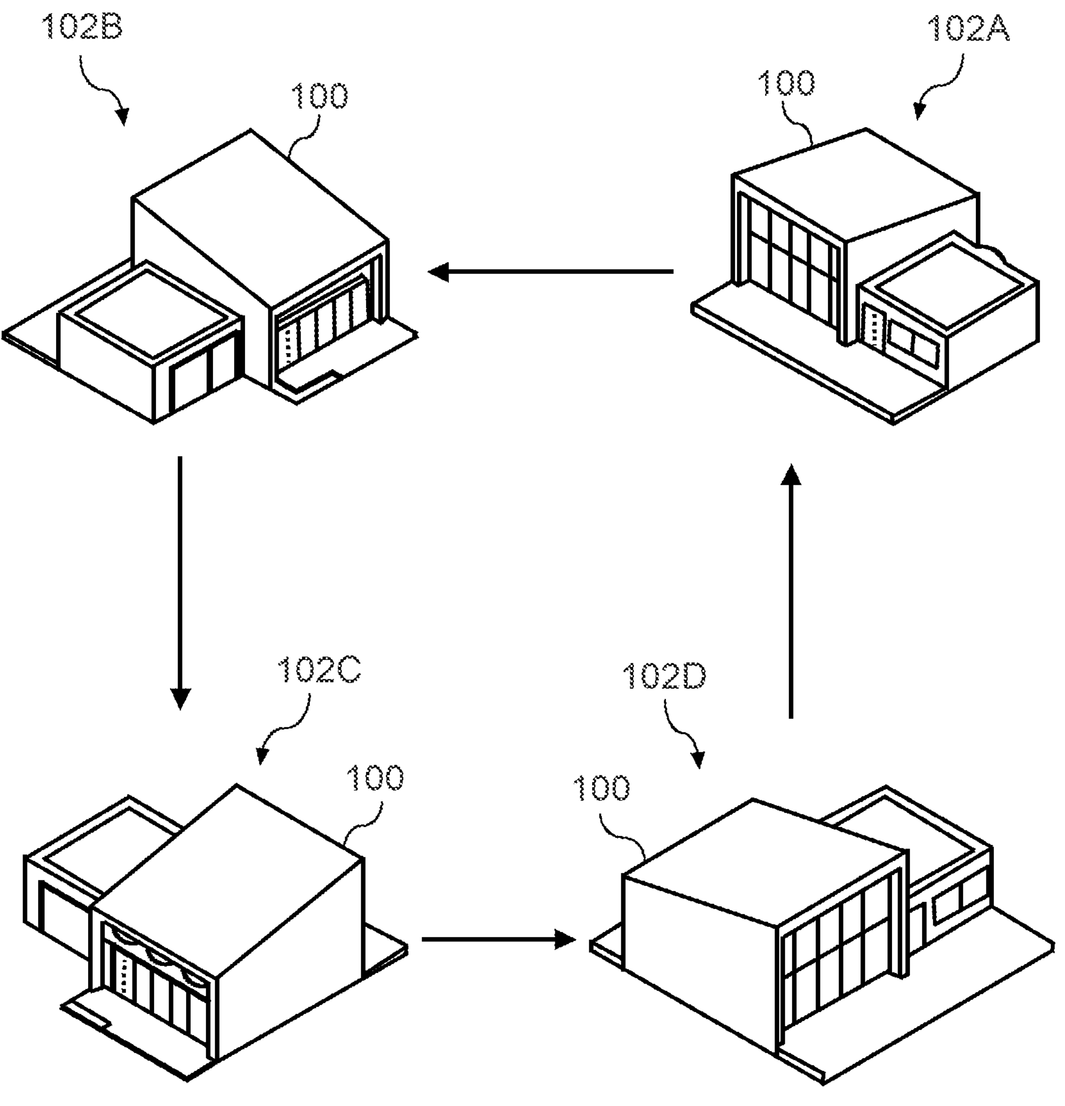
FIG. 1 depicts example camera viewpoints of a point of interest (POI) according to example embodiments of the present disclosure.

Repeat use of reference characters in the present specification and drawings is intended to represent the same and/or analogous features or elements of the present invention.

DETAILED DESCRIPTION

Example aspects of the present disclosure are directed to computing systems and methods for generating movement patterns for camera viewpoints within virtual environments. In some instances, virtual environments offer immersive views of a variety of three-dimensional entities within that virtual environment. One such virtual environment may be, for instance, a mapping application offering immersive views of Earth. Some mapping applications provide users with the ability to explore various places around the world and, in some instances, even provide three-dimensional representations of those places. More specifically, some mapping applications provide users with the ability to explore three-dimensional representations of prominent locations (e.g., the Eiffel Tower, the Golden Gate Bridge, St. Peter's Basilica, etc.) from around the world. For example, some mapping applications provide a "fly-by" of various prominent locations, in which a user is able to view a three-dimensional representation of the location from all angles. More specifically, a "fly-by" may include a video from the perspective of a virtual camera as it orbits around a three-dimensional representation of a particular point of interest (POI) within the virtual environment itself.

However, generating these "fly-by" tours around POIs within the virtual environment is challenging for a number of reasons. For example, determining an adequate starting position is critical to the user experience and primarily depends on the framing of the particular POI from the initial camera viewpoint. Furthermore, determining the orbit path is challenging, particularly in dense environments and/or in situations where the particular POI is surrounded by other three-dimensional entities that may obstruct the camera viewpoint along the orbit path. As such, current practice involves manually selecting the initial starting point and orbit path, which is neither efficient nor cost-effective.

Accordingly, example aspects of the present disclosure are directed to systems and methods for determining optimal movement patterns around three-dimensional representations of a particular POI based on images (and corresponding metadata) captured and submitted by users. More particularly, example aspects of the present disclosure provide systems and methods configured to determine an optimal starting point and orbit path for movement patterns around the three-dimensional POIs. First, the images are sorted and clustered based on the geolocation from which the image was captured. Next, a particular cluster that includes the "best" image is selected. The cluster that includes the image having the highest "interaction metric" is selected, and a centroid for that particular cluster is then calculated which, in turn, serves as a reference point for determining a starting position for the movement pattern.

More particularly, each image includes corresponding image information (e.g., metadata), including various metrics indicative of the quality of the corresponding image (hereinafter "quality metrics" and/or "interaction metrics"). Interaction metrics are not based on the content of the corresponding images (e.g., pixels, color, saturation, etc.). Rather, interaction metrics are inferred based, at least in part, on data indicative of user interaction and/or response to the corresponding image. For example, each of the plurality of images may include a result image that has previously been provided as a search result by a search service (e.g., search application). For each result image, the interaction metric is derived from information descriptive of historical user responses to the result image when the result image is provided as a search result by the search service. In this way, interaction metrics may be indicative of a "popularity" and/or "quality" of the associated image. Furthermore, because interaction metrics are not based on image content, an example computing system may obtain this data from other sources (e.g., search application, mapping application, etc.). In this manner, the cluster that includes the image having the highest interaction metrics, which are based on both quantitative and qualitative measurements, is selected, and a centroid for that cluster is calculated. As noted above, the centroid of the selected cluster is used as an initial reference point for determining the starting position of the movement pattern.

Once the initial reference point (e.g., centroid) is calculated, a series of tests can then be performed to ensure an adequate starting position is selected. For instance, the visibility of the POI from the initial reference point can be checked. If the full height of the POI is not visible, the visibility of the POI can be checked from a point that is farther away from the POI (along a horizontal axis) than the initial reference point. This process can be repeated until the full height of the POI is visible, and the position at which the full height of the POI is visible can be selected as the starting position for the movement pattern.

Once the starting position for the movement pattern has been selected, the orbit path of the movement pattern can then be determined. The movement pattern will follow an elliptical orbit path between the starting position and a secondary position. More specifically, once the starting position and secondary position are selected, the movement pattern will lerp between those two positions along an elliptical path. If an obstruction is detected along the orbit path, one or more waypoint candidates can be determined by incrementally testing various points proximate to the point on the orbit path where the obstruction is present. Examples of obstructions along the orbit path can include, for instance, a three-dimensional structure. Likewise, the same process can be followed in the event the orbit path gets too close to and/or too far from the POI. In the event one or more waypoints are added along the orbit path, the movement pattern will lerp between the starting position, the secondary position, and the added waypoints.

Finally, once the orbit path is selected, the orbit speed of the movement pattern can then be determined. It should be noted that the orbit speed along the movement pattern can be dynamic, meaning the orbit speed is not constant along the orbit path. More specifically, the orbit speed can decrease as the movement pattern gets closer to the POI. Likewise, the orbit speed can increase as the movement pattern gets farther away from the POI.

Aspects of the present disclosure provide a number of technical effects and benefits. For instance, example aspects of the present disclosure provide systems and methods for efficiently generating movement patterns for use in a variety of virtual environments. As such, the disclosed systems and methods can significantly reduce the time needed to provide a user with the desired movement pattern, as well as significantly reduce the costs associated therewith. Furthermore, by leveraging user-submitted data (e.g., images, metadata), example aspects of the present disclosure provide valuable improvements to the quality (and accuracy) of mapping applications and databases. Even further, the systems and methods provided herein provide resulting improvements to computing technology tasked with generating and storing data for use in virtual environments. Improvements in the speed and accuracy of generating and storing data for use in virtual environments can directly improve operational speeds for computing systems. Improvements in the speed and accuracy of processing and generating movement patterns can directly improve operational speeds for computing systems.

For instance, by leveraging preexisting feedback data indicative of the quality of the image, the need to process the images to determine the quality of the image is eliminated. In this way, example aspects of the present disclosure provide increased performance and efficiency in computing systems for quality image identification operations. Furthermore, using preexisting feedback data in image quality identification operations reduces processing and storage requirements for the computing system. Hence, the reduced processing and storage requirements ultimately result in more efficient resource allocation and/or use for the computing system. In this way, valuable computing resources within a computing system that would have otherwise been needed for such tasks can be reserved for other tasks. Hence, the reduced processing and storage requirements ultimately result in more efficient resource allocation/use for the computing system. In this way, valuable computing resources within a computing system that would have otherwise been needed for such tasks can be reserved for other tasks.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

As used herein, the terms “first,” “second,” and “third” may be used interchangeably to distinguish one component from another and are not intended to signify location or importance of the individual components. The term “entity” refers to a human, a user, an end-user, a consumer, a computing device and/or program (e.g., a processor, computing hardware and/or software, an application, etc.), an agent, a machine learning (ML) and/or artificial intelligence (AI) algorithm, model, system, and/or application, and/or another type of entity that can implement and/or facilitate implementation of one or more implementations of the present disclosure as described herein, illustrated in the accompanying drawings, and/or included in the appended claims. The terms “includes” and “including” are intended to be inclusive in a manner similar to the term “comprising.” Similarly, the term “or” is generally intended to be inclusive (e.g., “A or B” is intended to mean “A or B or both”). The term “at least one of” in the context of, e.g., “at least one of A, B, and C” refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms “a,” “an,” and “the” include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as “generally,” “about,” “approximately,” and “substantially,” are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., “generally vertical” includes forming an angle of up to ten degrees in any direction, e.g., clockwise or counterclockwise, with the vertical direction V.

The word “exemplary” is used herein to mean “serving as an example, instance, or illustration.” In addition, references to “an embodiment” or “one embodiment” does not necessarily refer to the same embodiment, although it may. Any implementation described herein as “exemplary” or “an embodiment” is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 depicts example viewpoints 102A, 102B, 102C, 102D of an example point of interest (POI 100) according to example embodiments of the present disclosure. More particularly, as will be discussed in greater detail below, example viewpoints 102A-102D may correspond to four points along an example movement pattern around the POI 100 within a three-dimensional virtual environment. Furthermore, as used herein, “Point of Interest” or “POI” refers to a specific location, place, site, business, neighborhood, geographic area, etc. For example, a POI can refer to a place that attracts attention, curiosity, or interest due to its unique characteristics, historical significance, cultural relevance, natural beauty, or other distinguishing features. POIs may vary widely and include landmarks, historical sites, tourist attractions, natural wonders, monuments, museums, parks, and other places that people may choose to visit or may otherwise be interested in. It should be noted that the POI 100 in FIG. 1 is depicted as a house for purposes of illustration and discussion. POI 100 may be any suitable POI without deviating from the scope of the present disclosure.

POI 100 may be a three-dimensional representation that exists within a three-dimensional environment. In some embodiments, the three-dimensional environment may be presented within an application, such as a mapping application, visual search application, image search application, etc. Furthermore, the three-dimensional environment may include three-dimensional representations of real-life objects and/or locations. Additionally and/or alternatively, the three-dimensional environment may include imagery corresponding to the real-life object and/or location. In some embodiments, the imagery may include photorealistic images and/or abstract images. Additionally and/or alternatively, in some embodiments, the imagery may include a combination of photorealistic images and abstract images.

By way of example, in some embodiments, the POI 100 may be a three-dimensional representation within, e.g., a mapping application. More particularly, the three-dimensional environment may correspond to a three-dimensional virtual rendering of Earth, complete with three-dimensional representations of buildings, trees, landmarks, etc. However, it should be noted that the three-dimensional environment may be any suitable three-dimensional environment depicting three-dimensional representations of objects and/or locations without deviating from the scope of the present disclosure.

As shown, POI 100 is depicted from example viewpoints 102A, 102B, 102C, 102D. Example viewpoints 102A, 102B, 102C, 102D may correspond to example viewpoints from a virtual camera configured to image the three-dimensional environment. In some embodiments, it may be useful to generate a "fly-by" view of the POI 100 within the three-dimensional environment. In this manner, users of the three-dimensional environment are able to "fly by" and view the POI 100 from multiple perspectives (e.g., different sides). Hence, viewpoint 102A depicts a first frame of the "fly-by" orbit of POI 100, viewpoint 102B depicts a second frame of the "fly-by" orbit of POI 100, viewpoint 102C depicts a third frame of the "fly-by" orbit of POI 100, and viewpoint 102D depicts a fourth frame of the "fly-by" orbit of POI 100. It should be noted that, although depicted as having four still viewpoints 102A-102D, an example "fly-by" view according to example embodiments of the present disclosure is a continuous 3600 orbital view of a POI, such as POI 100. Indeed, the POI 100 is depicted from four viewpoints 102A-102D in FIG. 1 for purposes of illustration and discussion.

Figure 2:
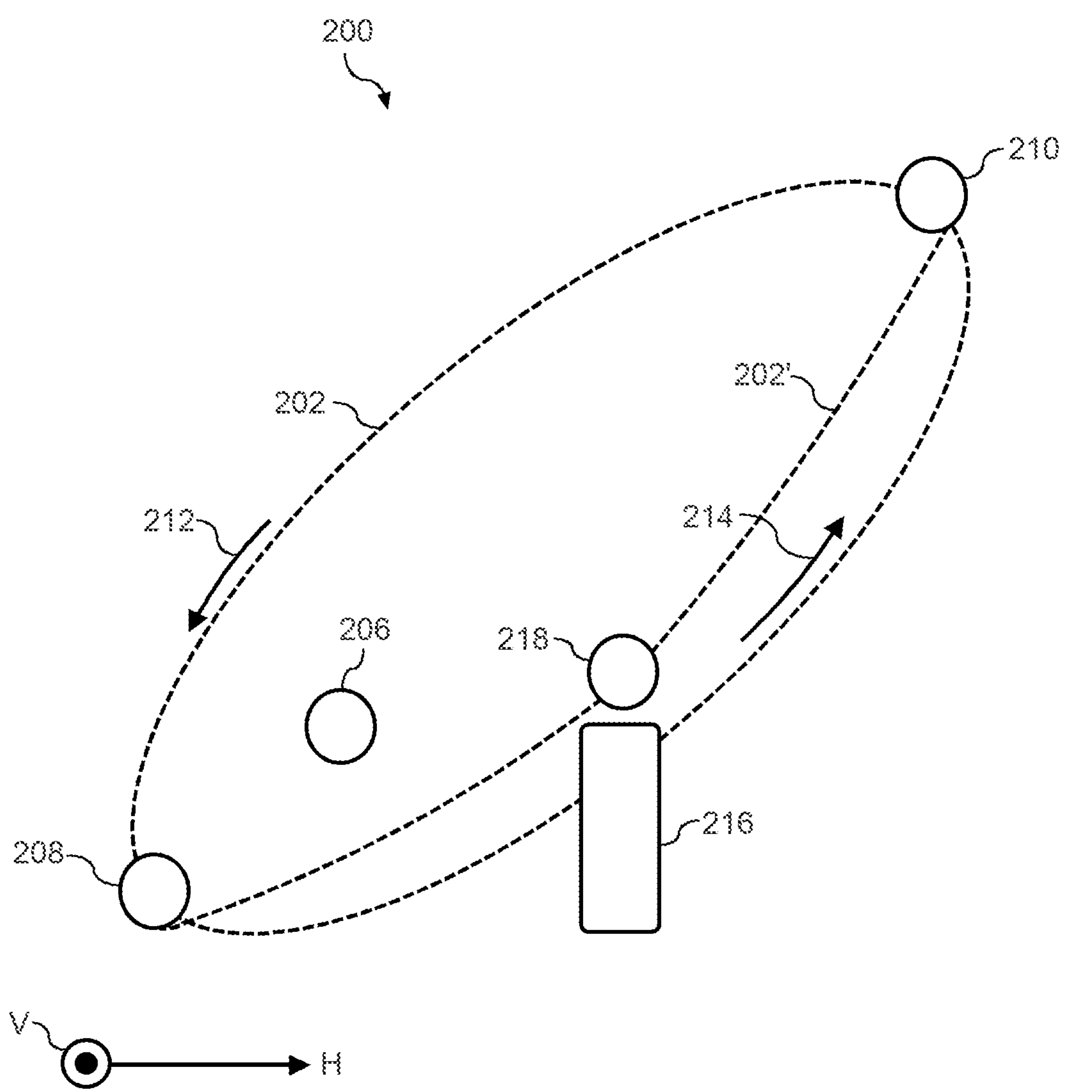
FIG. 2 depicts an example movement pattern according to example embodiments of the present disclosure.

FIG. 2 depicts an example movement pattern 202 in an example environment 200 according to example embodiments of the present disclosure. Although depicted in two dimensions, it should be understood that the environment 200 shown in FIG. 2 is a cross-sectional view of an example three-dimensional environment of the present disclosure. More particularly, FIG. 2 depicts a cross-sectional view of the three-dimensional environment 200 along an orbital plane defined by the movement pattern 202.

As shown, the movement pattern 202 may be for a camera viewpoint 204 within the three-dimensional environment 200, such as, e.g., a mapping application. More particularly, as noted above, the camera viewpoint 204 may move along the movement pattern 202 such that the camera viewpoint 204 moves around a three-dimensional representation of a POI 206 within the three-dimensional environment 200.

Example aspects of the present disclosure provide a computing system having one or more processor devices that may generate the movement pattern 202 for the camera viewpoint 204. To generate the movement pattern 202, the computing system must first determine a starting position 208 for the camera viewpoint 204. As will be discussed in greater detail below, the computing system may leverage pre-existing data associated with a plurality of images to determine the starting position 208 (and the movement pattern 202 more broadly). In this manner, the present disclosure provides systems and methods for generating the movement pattern 202 without requiring processing of a plurality of images and associated image data.

It will be appreciated that the terms "system" or "engine" can refer to specialized hardware, computer logic that executes on a more general processor, or some combination thereof. Thus, a system or engine can be implemented in hardware, application-specific circuits, firmware, and/or software controlling a general-purpose processor. In one embodiment, the systems can be implemented as program code files stored on a storage device, loaded into memory, and executed by a processor or can be provided from computer program products, for example, computer executable instructions, which are stored in a tangible computer-readable storage medium such as RAM, hard disk, or optical or magnetic media.

The computing system may obtain a plurality of images. The plurality of images can be result images from a set of result images that are provided as search results for a search service (e.g., a visual search service). Such result images can originate from a variety of sources, such as user-generated content (e.g., images captured by users), stock images, maps-related imagery (e.g., "street-view" imagery, etc.) advertising materials, etc.

The computing system can obtain image information associated with the plurality of images. The associated image information for each of the plurality of images may include a plurality of image characteristics, such as a geolocation characteristic and an interaction metric. The geolocation characteristic may be indicative of a geolocation at which an image was captured. The interaction metric may be derived from previous user interactions with the image, such as previous user interactions with the image in a mapping application and/or a search application. More particularly, the interaction metric may be based on user feedback that is indicative of a quality of the image. For example, assume that the plurality of images includes two images that have been previously used as search results for a visual search service. If more users interacted with the first image than the second image within the visual search service, the interaction metric for the first image will be higher than the interaction metric for the second image.

After obtaining the plurality of images and associated image information, the computing system may, in some embodiments, filter the plurality of images based on the interaction metric associated with each image of the plurality of images. For instance, in some embodiments, the computing system may filter each image having an interaction metric below a predetermined threshold. The computing system may then cluster each of the plurality of images to generate one or more clusters. More particularly, the computing system may cluster the plurality of images based, at least in part, on the geolocation characteristic associated with each image of the plurality of images.

Figure 3A:
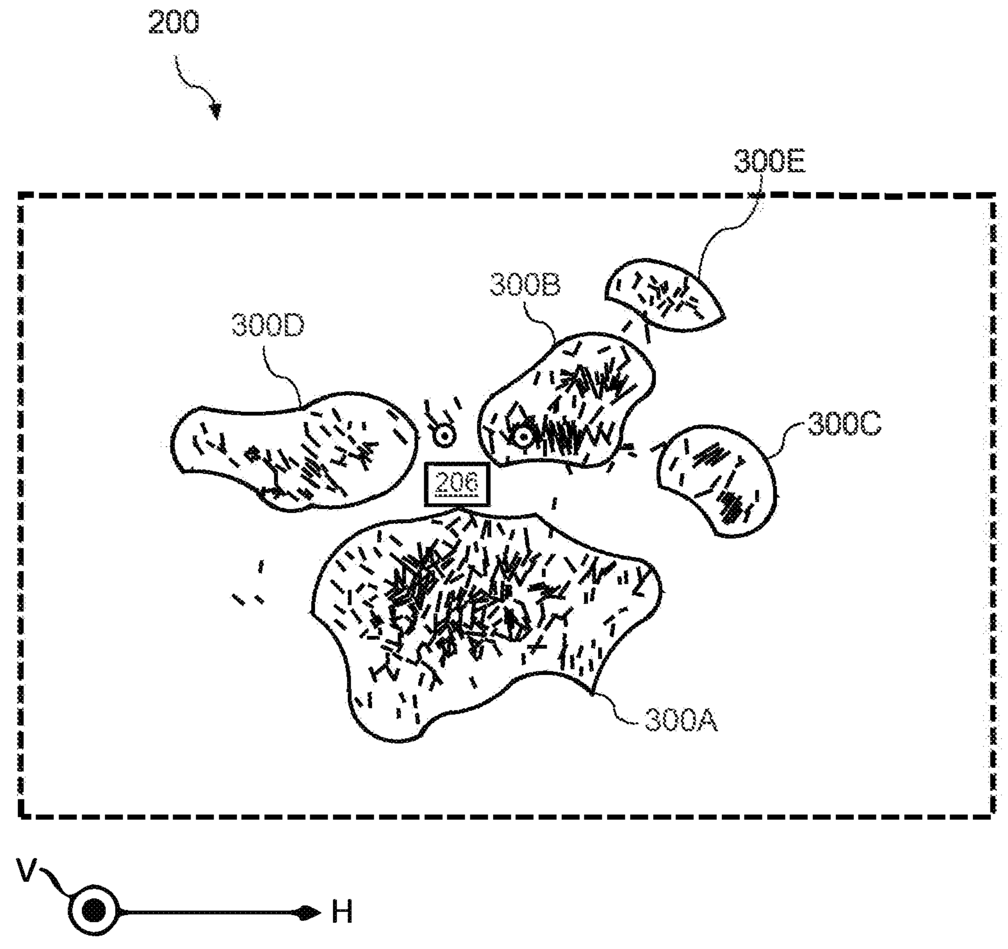
FIG. 3A depicts example clusters of a plurality of images according to example embodiments of the present disclosure.

As an illustrative example, referring briefly to FIG. 3A, example clusters 300 are depicted according to example embodiments of the present disclosure. More particularly, FIG. 3A depicts clusters 300A-300E (generally, clusters 300), each of which having a plurality of images, proximate to the POI 206 within the three-dimensional environment 200. As noted above, each of the plurality of images has an associated geolocation characteristic indicative of the geolocation at which the image was captured. Using this geolocation characteristic, the computing system may cluster each of the plurality of images to generate the clusters 300.

The computing system can filter the plurality of images based on the clusters 300. To follow the depicted example, the cluster 300A includes a greater number of images than the cluster 300E. As such, the computing system can determine that the POI 206 is more recognizable from the geolocation associated with the cluster 300A than the geolocation associated with the cluster 300E. Based on the determination, the computing system can remove the images clustered to cluster 300E.

For another example, the cluster 300A includes a similar number of images to the cluster 300B. As such, the computing system can determine that the POI 206 is equally recognizable from the geolocation associated with the cluster 300A as the geolocation associated with the cluster 300B. As such, the computing system can refrain from filtering the images clustered to either of clusters 300A and 300B.

If clusters 300C and 300D include an equal, or similar, number of images as clusters 300A and 300B, the computing system may determine that the POI 206 is visible and/or recognizable from any side thereof (e.g., from any of the clusters 300A-300E), and therefore refrain from filtering any images clustered to the clusters 300C and 300D.

As such, the computing system may determine the starting position 208 (FIG. 2) of the movement pattern 202 (FIG. 2) based, at least in part, on the position of the clusters 300A-300E relative to the POI 206 within the three-dimensional environment 200. For example, the computing system may select the most densely-populated clustering sub-area among the clusters 300. For another example, the computing system may select one of the clusters 300 based on an evaluation of other image characteristics.

Figure 3B:
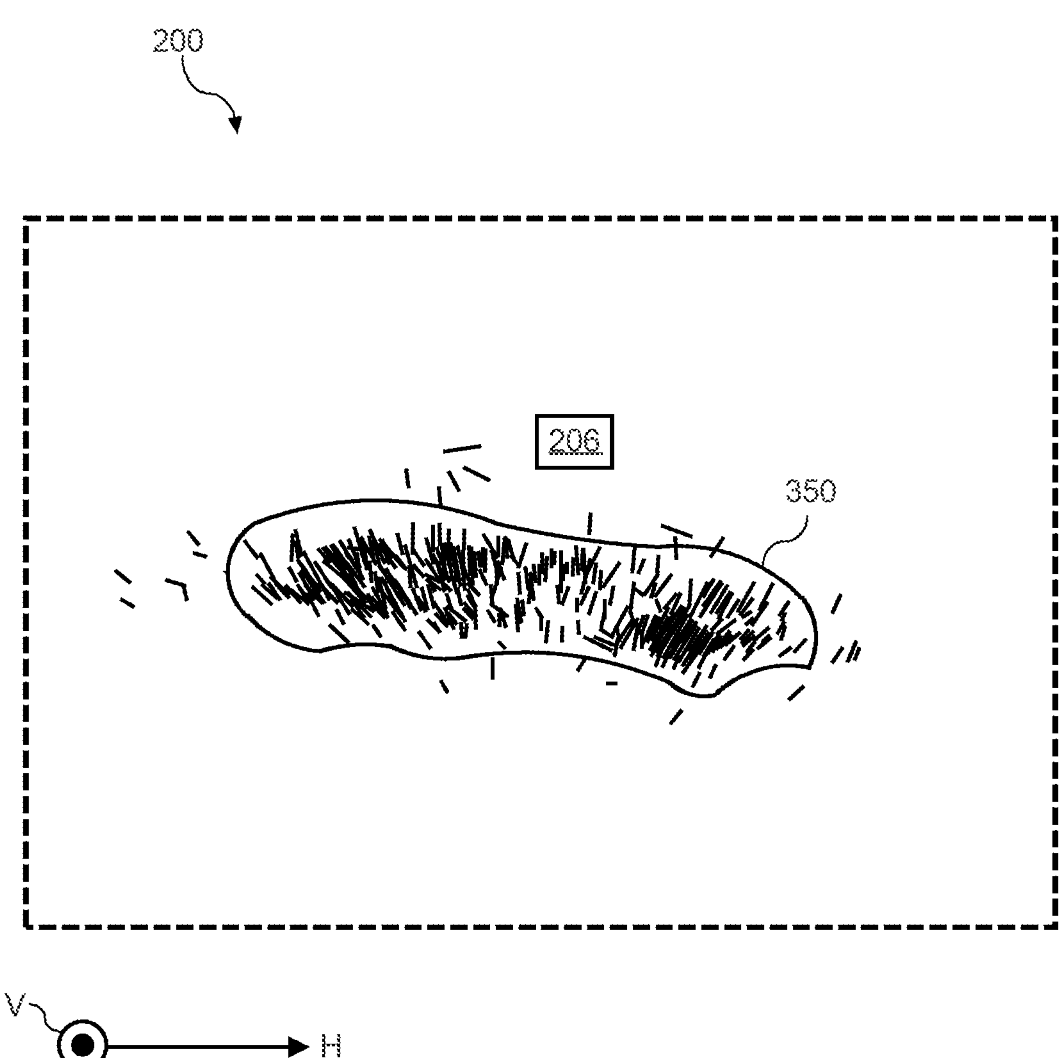
FIG. 3B depicts example clusters of a plurality of images according to example embodiments of the present disclosure.

As an additional illustrative example, referring briefly to FIG. 3B, an example cluster 350 is depicted according to example embodiments of the present disclosure. More particularly, FIG. 3B depicts cluster 350, which includes a plurality of images, proximate to the POI 206 within the three-dimensional environment 200. However, in contrast to the example clusters 300A-300E depicted in FIG. 3A, cluster 350 does not surround the POI 206. Rather, cluster 350 faces one side of the POI 206. As such, the computing system may determine that the POI 206 may only be visible and/or recognizable from one side (e.g., the side facing the cluster 350). Thus, the starting position 208 (FIG. 2) of the movement pattern 202 (FIG. 2) may be set to face the POI 206 based, at least in part, on the position of the cluster 350 relative to the POI 206 within the three-dimensional environment 200.

Referring again to FIG. 2, after clustering each of the plurality of images to generate one or more clusters, the computing system may select a particular image in a particular cluster based, at least in part, on the image information. More particularly, as will be discussed in greater detail below with reference to FIGS. 5-7, the computing system may determine a selected cluster based, at least in part, on the interaction metrics associated with each image in the cluster. For instance, the computing system may select the cluster having an image with the highest interaction metric as the selected cluster.

In some implementations, to determine the starting position 208, the computing system may calculate a centroid (e.g., a center point) of the selected cluster. The centroid of the selected cluster may then be used as an initial heading for the starting point. As used herein, a "heading" refers to a three-dimensional direction within the three-dimensional environment 200. Furthermore, as discussed in greater detail below, the computing system may then determine the starting position 208 based, at least in part, on the initial heading associated with the centroid of the selected cluster.

In some implementations, after determining the starting position 208, the computing system may then determine a secondary position 210. By determining the starting position 208 and the secondary position 210, the computing system can generate the movement pattern 202 and its corresponding orbit shape through, e.g., linear interpolation methods. Linear interpolation refers to a method of estimating intermediate values lying between known data points. For example, the computing system may determine the orbit shape of the movement pattern 202 by using linear interpolation methods to estimate intermediate positions of the movement pattern 202 between the starting position 208 and the secondary position 210. Thus, the camera viewpoint 204 may lerp between the starting position 208 and the secondary position 210, thereby providing an elliptical orbit path for the movement pattern 202. In some embodiments, the movement pattern 202 may have an elliptical shape. In other embodiments, the movement pattern 202 may have a circular shape. It should be noted that the camera viewpoint 204 shown in FIG. 2 depicts a perspective of the camera viewpoint 204 from the secondary position 210 of the movement pattern 202.

In some embodiments, the starting position 208 may correspond to a "close-up" view of the POI 206, and the secondary position 210 may correspond to a "overview" of the POI 206. For instance, as shown in FIG. 2, the starting position 208 is closer to the POI 206 than the secondary position 210 along a horizontal axis H of the three-dimensional environment 200. As such, the camera viewpoint 204 from the starting position 208 depicts a close view of the POI 206, and the camera viewpoint 204 from the secondary position 210 depicts a view of the POI 206 and its immediate surroundings. In this manner, the movement pattern 202 can be a dynamic elliptical orbit path that provides multiple and varying perspectives of the POI 206 (e.g., a full 360° view).

In some implementations, after determining the orbit path for the movement pattern 202, the computing system may then determine an orbit speed of the camera viewpoint 204. In some embodiments, the computing system may decrease the orbit speed of the camera viewpoint 204 as the distance between the camera viewpoint 204 and the POI 206 decreases. Additionally, the computing system may increase the orbit speed of the camera viewpoint 204 as the distance between the camera viewpoint 204 and the POI 206 increases. For instance, as the camera viewpoint 204 travels along the movement pattern 202 in the direction represented by arrow 212, the orbit speed may decrease. Conversely, as the camera viewpoint 204 travels along the movement pattern 202 in the direction represented by arrow 214, the orbit speed may increase.

In some implementations, the orbit speed can be determined based on the image clusters described with regards to FIGS. 3A-3B. For example, turning to FIG. 3A, assume that the clusters 300A, 300B, 300C, and 300D all include an equal number of images. Further assume that the interaction metrics associated with the cluster 300C are substantially lower than those associated with clusters 300A, 300B, and 300D. The computing system can determine the orbit speed such that the camera orbits at a higher speed while located within an area corresponding to the cluster 300C, and orbits at a slower speed while located within areas corresponding to clusters 300A, 300B, and 300D.

In some implementations, the movement pattern 202 can be a non-elliptical movement pattern. For example, turning to FIG. 3B, the cluster 350 is widely distributed across the "front" of the POI 206. However, no images are clustered to form a cluster behind the POI 206 or to the side of the POI 206. Based on the cluster 350, the computing system may determine a linear or semi-circular movement pattern that traverses the front of the POI 206 without moving "behind" the POI 206.

Figure 4:
FIG. 4 depicts a flow chart of an example computer-implemented method according to example embodiments of the present disclosure.
Figure 4:
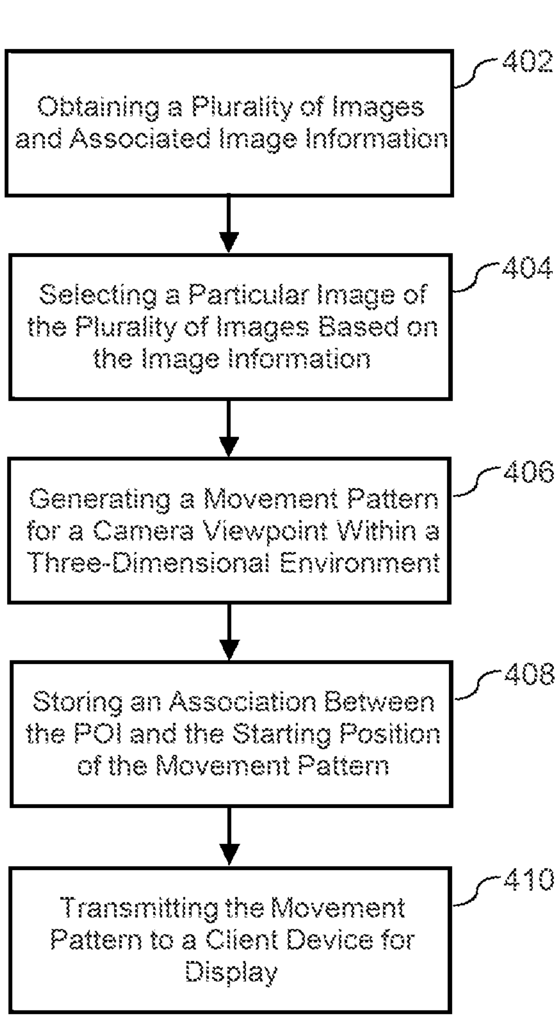

FIG. 4 depicts a flow diagram of an example computer-implemented method 400 to perform according to example embodiments of the present disclosure. One or more portion (s) of the method can be implemented by one or more computing devices such as, for example, the computing devices described herein. Moreover, one or more portion(s) of the method can be implemented as an algorithm on the hardware components of the device(s) described herein. Although FIG. 4 depicts steps performed in a particular order for purposes of illustration and discussion, the methods of the present disclosure are not limited to the particularly illustrated order or arrangement. The various steps for the method 400 can be omitted, rearranged, combined, and/or adapted in various ways without deviating from the scope of the present disclosure.

At (402), a computing system can obtain a plurality of images and associated image information. More particularly, the computing system can obtain a plurality of images that each depict the same Point of Interest (POI). For instance, one of the plurality of images may depict the POI from the north side of the POI while another of the plurality of images may depict the POI from the south side of the POI. Images included in the plurality of images can originate from a variety of sources, such as user-generated content, indexed search result images (e.g., from a search application), stock images, still video frames, multiple frames of video data, etc.

It should be understood that the images obtained by the computing system at (402) may be associated with a search application (e.g., image/visual search service) that is configured to provide the images to a user in response to a prompt (e.g., query) from the user. In particular, the computing system can be associated with a search service that provides image search or visual search services. For example, the computing system may be part of a network of computing system(s) and device(s) that provide a collection of services within a service environment, such as mapping services, computer vision services, search services, image search services, etc. As such, the computing system can access images that have been used as search results in response to queries provided to an image search service.

Specifically, image search services can return image search results responsive to a query (e.g., a textual query, an image query, etc.). Conventionally, many search services will evaluate user response to search results so that future search results can be optimized. User response to a search result (i.e., a result image) can be evaluated in a variety of ways. For example, a result image can be evaluated based on the percentage of users that interact with the result image when the result image is visible to the user. For another example, the search service can prompt the user to share feedback regarding the quality of the result image. Search services can assign interaction metrics to result images based on the evaluation of user responses to the search result.

Search services can also process the images and collect contextual information associated with the images, such as the coordinates from which the image was captured, the time of day the image was captured, a vector indicating the direction from which the image was captured, etc. This contextual information can also be used by the search services in its assignment of interaction metrics to the images. In this way, by accessing an associated search application and its corresponding image-related data, the computing system does not need to process the plurality of images, because each of the plurality of images has already been processed and/or evaluated prior to being obtained by the computing system at (402).

The computing system may also obtain image information associated with each of the plurality of images. The image information may be descriptive of a plurality of image characteristics for each of the plurality of images. The plurality of image characteristics can include a geolocation characteristic indicative of a geolocation at which an image was captured. The plurality of image characteristics can include the interaction metric derived from previous user interactions with the image. The interaction metric associated with each image of the plurality of images may be based, at least in part, on user feedback indicative of a quality of the image. For instance, as described previously, the interaction metric may be derived from pervious user interactions with the image within, e.g., a mapping application and/or a search application.

Additionally and/or alternatively, in some embodiments, the computing system may obtain a plurality of user images provided by users of a mapping application. The mapping application can be the same application that is configured to provide the three-dimensional environment to the user.

It should be noted that, in many instances, the interaction metrics obtained by the computing system have already been generated and stored by a search service. Because these interaction metrics are already created and maintained as a necessary step of a separate process, there is no additional expenditure of compute resources required to calculate the interaction metrics. In this fashion, by leveraging existing information, implementations of the present disclosure can efficiently determine optimal movement patterns for camera viewpoints within the three-dimensional environment while minimizing the expenditure of compute resources.

At (404), the computing system can select a particular image of the plurality of images based on the image information.

Figure 5:
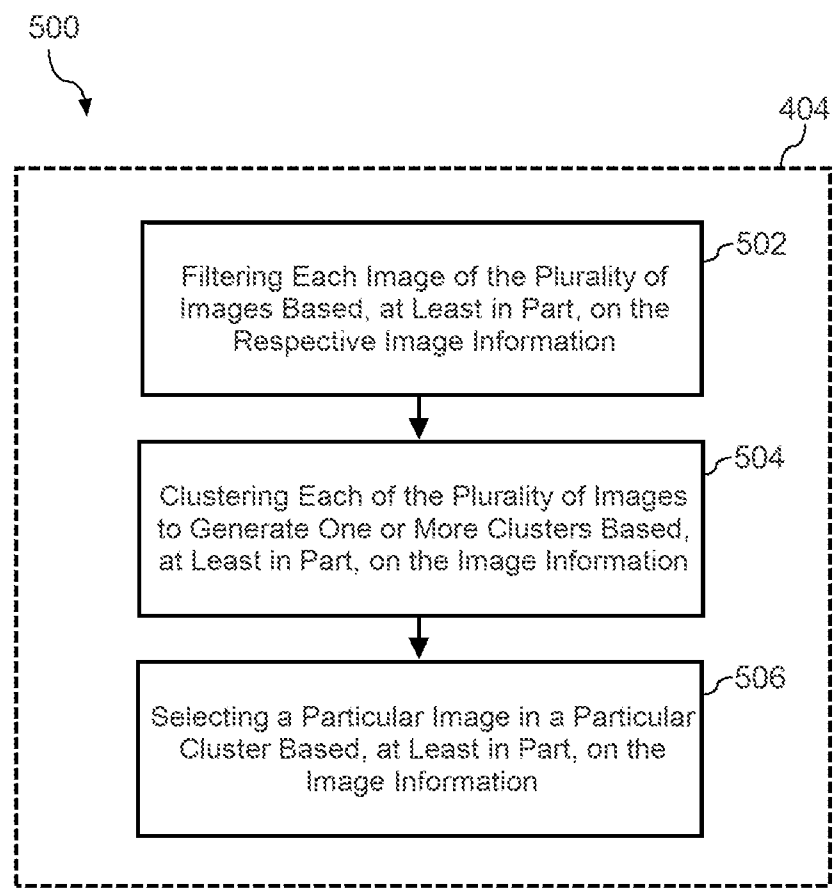
FIG. 5 depicts a flow chart of an example computer-implemented method according to example embodiments of the present disclosure.

By way of example, FIG. 5 depicts a flow diagram of an example computer-implemented method 500 to perform according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. Although FIG. 5 depicts steps performed in a particular order for purposes of illustration and discussion, the methods of the present disclosure are not limited to the particularly illustrated order or arrangement. The various steps for the method 500 can be omitted, rearranged, combined, and/or adapted in various ways without deviating from the scope of the present disclosure.

Referring now to FIG. 5 at (502), for each image of the plurality of images, the computing system can filter the image from the plurality of images. More particularly, the computing system may filter an image from the plurality of images in response to determining that the interaction metric associated with that particular image is below a predetermined threshold metric. In this manner, the computing system may filter each image falling below the predetermined threshold metric from the plurality of images prior to the plurality of images being clustered at (504).

Referring now to FIG. 5 at (504), the computing system can cluster each of the plurality of images to generate one or more clusters based, at least in part, on the image information. More particularly, the computing system may cluster each of the plurality of images, thereby forming the one or more clusters of images, based on the image information associated with each respective image, such as the geolocation characteristic indicating the geolocation at which the image was captured.

In some embodiments, to cluster each of the plurality of images, the computing system may sort each of the plurality of images into at least one cluster based, at least in part, on the geolocation at which each of the plurality of images was captured. For instance, as discussed above with reference to FIGS. 3A-3B, the computing system may cluster the plurality of images into clusters 300A-300E (FIG. 3A) and/or cluster 350 (FIG. 3B) based, at least in part, on the geolocation at which each of the plurality of images was captured in relation to the POI 206 (FIGS. 3A-3B).

Furthermore, referring again to FIG. 5 at (504), the computing system may determine a selected cluster of the one or more clusters based, at least in part, on the interaction metrics associated with one or more respective images from the one or more clusters. More particularly, to determine the selected cluster, the computing system may respectively identify one or more primary images from the one or more clusters. The primary image may include an image with the highest interaction metric of the images in the cluster. In some embodiments, each cluster may include one primary image. In other embodiments, each cluster may include more than one primary image. Additionally, each cluster of the one or more clusters may include the same number of primary images and/or a different number of primary images.

By way of example, referring again to FIG. 3A, the computing system may determine a selected cluster of the clusters 300A-300E based, at least in part, on the interaction metrics associated with each image in the clusters 300A-300E. For instance, to determine the selected cluster, the computing system may identify a primary image for each of the clusters 300A-300E. As noted above, in some embodiments, the primary image for cluster 300A may be the image in cluster 300A with the highest interaction metric. Likewise, the primary image for cluster 300B may be the image in cluster 300B with the highest interaction metric, the primary image for cluster 300C may be the image in cluster 300C with the highest interaction metric, etc.

Furthermore, referring again to FIG. 5 at (504), after identifying the one or more primary images, the computing system can select the selected cluster based, at least in part, on the interaction metric associated with the primary image of the cluster. More particularly, the interaction metric of the primary image of the selected cluster may be higher than the interaction metric of any other primary image of any other cluster.

By way of example, referring again to FIG. 3A, the computing system may select the selected cluster based, at least in part, on the interaction metric associated with each primary image of the clusters 300A-300E. For instance, if the primary image of cluster 300A has a higher interaction metric than the primary images of clusters 300B-300E, the computing system may select cluster 300A as the selected cluster.

Referring now to FIG. 5 at (506), responsive to clustering each of the plurality of images at (504), the computing system can select a particular image in a particular cluster based, at least in part, on the image information. For instance, as noted above, the computing system may select the selected cluster based on the interaction metric associated with the primary image(s) of each cluster. Following selection of the selected cluster, the computing system may select, for instance, the primary image of the selected cluster which may, in some embodiments, correspond to the image having the highest interaction metric of the images within the selected cluster. In this way, the particular image selected by the computing system may correspond to the "best" image of the plurality of images within the selected cluster.

Returning to FIG. 4 at (406), the computing system can generate a movement pattern for a camera viewpoint within a three-dimensional environment. More particularly, the movement pattern for the camera viewpoint may move around a three-dimensional representation of the POI within the three-dimensional environment. A starting position for the movement pattern may be based, at least in part, on the geolocation at which the particular image was captured.

Figure 6:
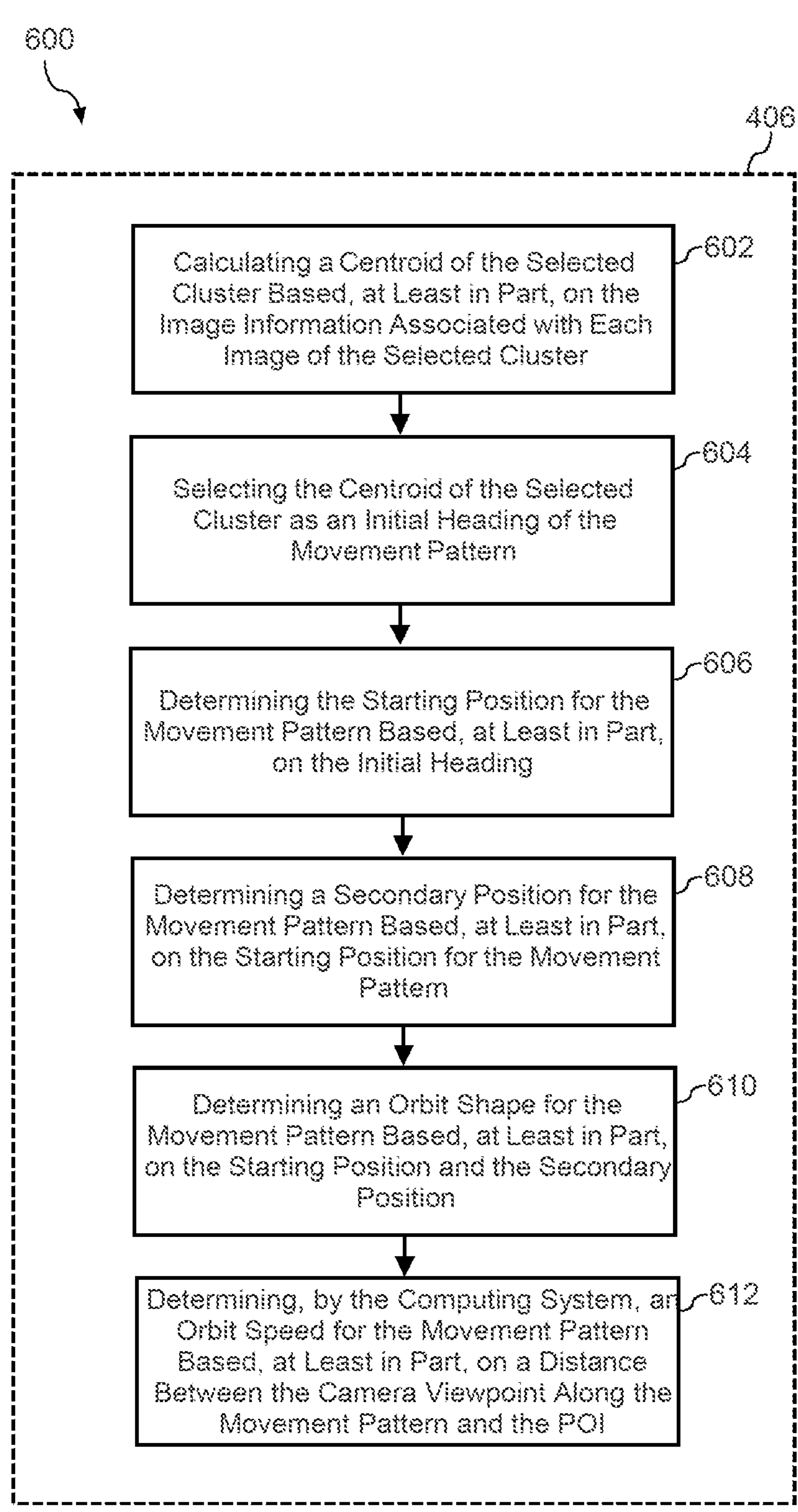
FIG. 6 depicts a flow chart of an example computer-implemented method according to example embodiments of the present disclosure.

By way of example, FIG. 6 depicts a flow diagram of an example computer-implemented method 600 to perform according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. Although FIG. 6 depicts steps performed in a particular order for purposes of illustration and discussion, the methods of the present disclosure are not limited to the particularly illustrated order or arrangement. The various steps for the method 600 can be omitted, rearranged, combined, and/or adapted in various ways without deviating from the scope of the present disclosure.

Referring now to FIG. 6 at (602), the computing system can calculate a centroid of the selected cluster based, at least in part, on the image information associated with each image of the selected cluster. More particularly, the computing system may calculate the centroid of the selected cluster based, at least in part, on the geolocation characteristic indicative of the geolocation at which each image of the selected cluster is captured.

By way of example, referring again to FIG. 3A and the example discussed above, the computing system may select cluster 300A as the selected cluster. Responsive to selecting cluster 300A as the selected cluster, the computing system may then calculate a centroid (e.g., center point) of the cluster 300A, which may subsequently be used by the computing system to determine the movement pattern.

Referring now to FIG. 6 at (604), the computing system can select the centroid of the selected cluster as an initial heading of the movement pattern. More particularly, the computing system may select the centroid for the selected cluster calculated at (602) as the initial heading of the movement pattern. As noted above, a "heading" refers to a three-dimensional direction within the three-dimensional environment.

Referring now to FIG. 6 at (606), the computing system can determine the starting position for the movement pattern based, at least in part, on the initial heading. More particularly, the computing system may determine the starting position for the movement pattern based, at least in part, on the initial heading selected at (604).

By way of example, referring again to FIG. 2, the computing system may determine the starting position 208 for the movement pattern 202 based, at least in part, on whether the full height of the POI 206 is visible from a viewpoint associated with the initial heading selected at (604). Put differently, the computing system may determine whether the full height of the POI 206 is in frame with respect to a viewpoint from the initial heading. This process of determining whether the full height of the POI 206 is in frame from a viewpoint is hereinafter referred to as "entity-framing operations."

Figure 7:
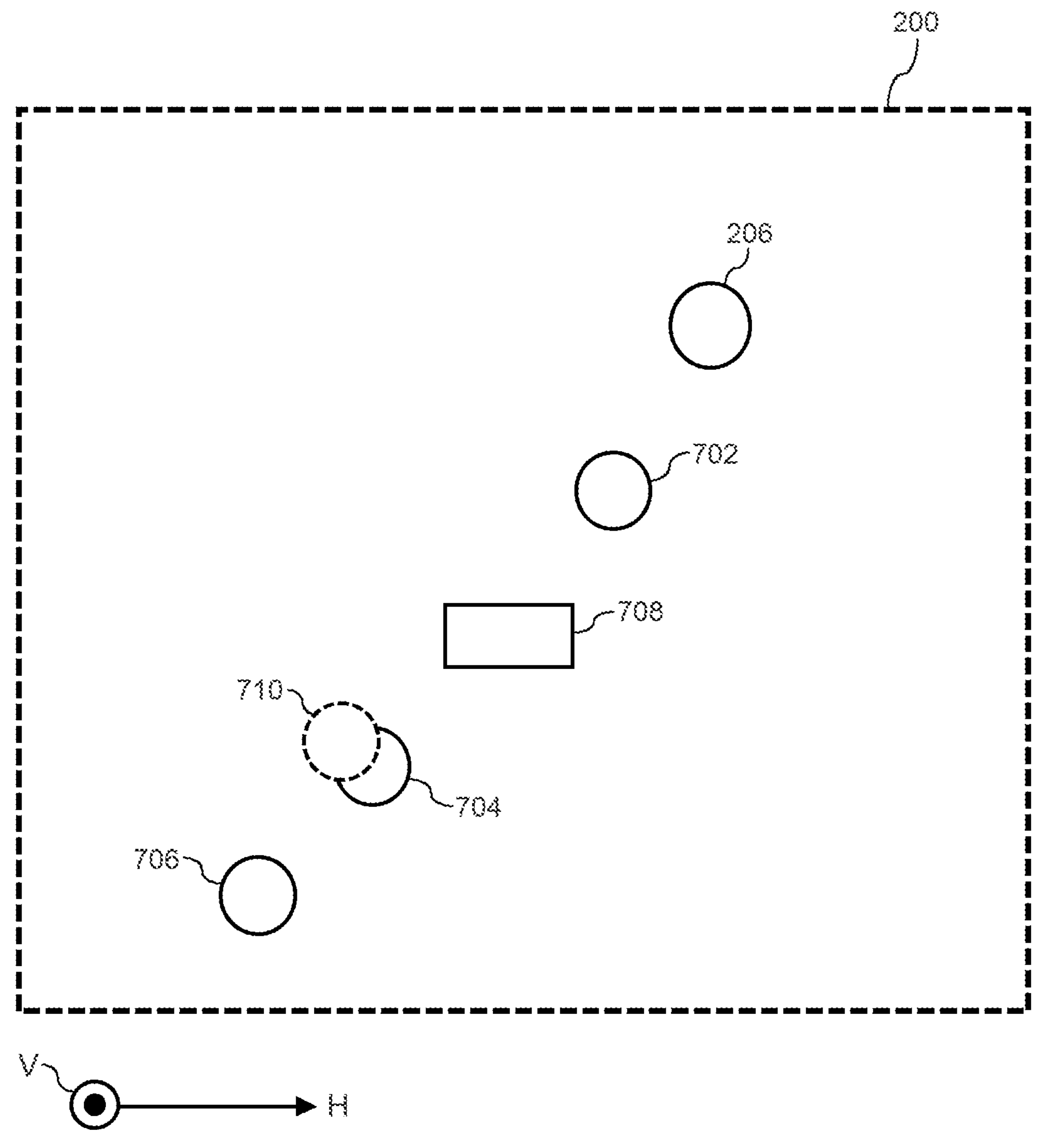
FIG. 7 depicts a close-up view of a portion of the environment of FIG. 2 according to example embodiments of the present disclosure.

An illustrative example of the entity-framing operations disclosed herein is depicted in FIG. 7. FIG. 7 depicts a portion of the three-dimensional environment 200 of FIG. 2 cross-sectioned along the orbital plane defined by the movement pattern 202. FIG. 7 also depicts an initial heading 702 which, as noted above, may correspond to the centroid of the selected cluster calculated at (602).

Turning now to the example entity-framing operations, the computing system may determine the starting position 208 (FIG. 2) for the movement pattern 202 (FIG. 2) based, at least in part, on whether the full height of the POI 206 is visible from a viewpoint associated with the initial heading 702.

Responsive to determining that the viewpoint associated with the initial heading 702 includes the full height of the POI 206 (e.g., the full height of the POI 206 is in frame), the computing system may select the initial heading 702 as the starting position 208 (FIG. 2) for the movement pattern 202 (FIG. 2). Conversely, responsive to determining that the viewpoint associated with the initial heading 702 does not include the full height of the POI 206 (e.g., the full height of the POI 206 is not in frame), the computing system may select a second heading 704 that is farther from the POI 206 than the initial heading 702 along a horizontal axis H of the three-dimensional environment 200. More particularly, as shown, the initial heading 702 may be closer to the POI 206 along the horizontal axis H than the second heading 704. In this manner, by selecting a second heading 704 that is farther from the POI 206 than the initial heading 702, a viewpoint associated with the second heading 704 may be more likely to include the full height of the POI 206 than the viewpoint associated with the initial heading 702.

Responsive to selecting the second heading 704, the computing system may perform the same entity-framing operations as described above. Put differently, responsive to selecting the second heading 704, the computing system may then determine whether the viewpoint associated with the second heading 704 includes the full height of the POI 206 in a similar manner as discussed above. More particularly, responsive to determining that a viewpoint associated with the second heading 704 includes the full height of the POI 206, the computing system may select the second heading 704 as the starting position 208 (FIG. 2) for the movement pattern 202 (FIG. 2). Conversely, responsive to determining that the viewpoint associated with the second heading 704 does not include the full height of the POI 206, the computing system may select a third heading 706 that is farther from the POI 206 than the second heading 704 along the horizontal axis H of the three-dimensional environment 200. The process described above, hereinafter referred to as "step-back operations," may be repeated until a heading is selected that has an associated viewpoint which includes the full height of the POI 206.

Referring still to FIG. 7, the three-dimensional environment 200 may include geometry that, depending on a location of the headings discussed above, may interfere and/or obstruct viewpoints associated with each of the headings. More particularly, in some embodiments, there may be an obstruction 708 (e.g., building, geometry, geographic feature, etc.) in the three-dimensional environment 200 between, e.g., the initial heading 702 and the second heading 704. In such embodiments, to ensure proper framing of the POI 206 from the updated heading (e.g., second heading 704), the step-back operations discussed above may not be sufficient to ensure proper selection of the starting position 208 (FIG. 2) for the movement pattern 202 (FIG. 2).

For instance, as noted above, the computing system may select a second heading 704 that is farther from the POI 206 than the initial heading 702 along a horizontal axis H in response to determining that the full height of the POI 206 is not visible from the initial heading 702. However, in some embodiments, the computing system may detect an obstruction 708 between the initial heading 702 and the second heading 704. Responsive to detecting the obstruction 708, the computing system may select a fourth heading 710 that is above the second heading 704 along a vertical axis V of the three-dimensional environment 200 by adding a vertical offset to the second heading 704. The process described above of adding a vertical offset to a heading in response to detecting an obstruction is hereinafter referred to as "step-up operations."

After selecting the fourth heading 710, the computing system may then perform the same entity-framing operations described above (e.g., determining whether the full height of the POI 206 is visible from a viewpoint associated with the fourth heading 710). More particularly, responsive to determining that the viewpoint associated with the fourth heading 710 includes the full height of the POI 206, the computing system may select the fourth heading 710 as the starting position 208 (FIG. 2) for the movement pattern 202 (FIG. 2). Conversely, responsive to determining that the viewpoint associated with the fourth heading 710 does not include the full height of the POI 206, the computing system may repeat the entity-framing operations, the step-back operations, and/or the step-up operations described above until a heading with an associated viewpoint having the full height of the POI 206 is selected.

Referring again to FIG. 2, in addition to the entity-framing operations described above, the computing system must also find the proper altitude for the starting position 208 of the movement pattern 202. As noted above, in some embodiments, the POI 206 may be such that an elevated starting position 208 (e.g., elevated along the vertical axis V of the three-dimensional environment 200) of the movement pattern 202 is required. By way of example, in embodiments where the POI 206 is, e.g., a stadium, the starting position 208 of the movement pattern 202 may be elevated such that an interior (e.g., a field) of the POI 206 is visible from the starting position 208. As such, the computing system may perform raycasting operations to determine the proper altitude (e.g., along the vertical axis V of the three-dimensional environment 200) of the starting position 208 of the movement pattern 202.

More particularly, in some embodiments, the computing system may generate a first raycast to a center of the POI 206 from the initial heading. The computing system may then select a second heading that is above the initial heading along the vertical axis V of the three-dimensional environment 200 by adding a vertical offset to the initial heading. Responsive to selecting the second heading, the computing system may generate a second raycast to the center of the POI 206 from the second heading. Then, the computing system may determine whether a length of the second raycast is greater than a length of the first raycast. For instance, responsive to determining that the length of the second raycast is greater than the length of the first raycast, the computing system may select the second heading as the starting position 208 for the movement pattern 202. Conversely, responsive to determining that the length of the second raycast is not greater than the length of the first raycast, the computing system may repeat the raycasting operations described above. In this manner, by performing the raycasting operations described above, the computing system may determine a heading for the starting position 208 of the movement pattern 202 having an associated viewpoint where the interior of the POI 206 is visible.

Referring now to FIG. 6 at (608), the computing system can determine a secondary position for the movement pattern based, at least in part, on the starting position for the movement pattern. More particularly, responsive to determining the starting position of the movement pattern at (606), the computing system may then determine a secondary position of the movement pattern.

By way of example, referring again to FIG. 2, the starting position 208 of the movement pattern 202 may correspond to the ideal close view of the POI 206, and the secondary position 210 of the movement pattern 202 may correspond to the ideal area-understanding view of the POI 206. It should be noted that, similar to the starting position 208, the entire POI 206 may be visible from a viewpoint associated with the secondary position 210. Furthermore, as will be discussed in greater detail below, an orbit of the movement pattern 202 may lerp between the starting position 208 and the secondary position 210.

Referring now to FIG. 6 at (610), the computing system can determine an orbit shape for the movement pattern based, at least in part, on the starting position and the secondary position. More particularly, after determining the starting position of the movement pattern at (606) and determining the secondary position of the movement pattern at (608), the computing system may determine an orbit shape for the movement pattern.

Referring again to FIG. 2, as noted above, the orbit of the movement pattern 202 may lerp between the starting position 208 and the secondary position 210 of the movement pattern 202. In this manner, an initial orbit shape of the movement pattern 202 may be in an ellipse. However, as noted above, the three-dimensional environment 200 may include geometry that, depending on a location of the starting position 208 and a location of the secondary position 210, may interfere and/or obstruct the initial elliptical orbit shape between the starting position and the secondary position. More particularly, in some embodiments, there may be an obstruction 216 (e.g., building, geometry, geographic feature, etc.) in the three-dimensional environment 200 between the starting position 208 and the secondary position 210. In such embodiments, to ensure proper framing of the POI 206 along the orbit path, the initial elliptical orbit shape of the movement pattern 202 may not be sufficient to ensure clear viewing of the POI 206 along the entire movement pattern 202. As such, the computing system may perform collision avoidance operations to update the orbit path, thereby ensuring the POI 206 is visible along the entire orbit path.

For instance, the computing system may detect the obstruction 216 along the movement pattern 202 between the starting position 208 and the secondary position 210. As used herein, "obstruction position" refers to a location along the movement pattern 202 where the detected obstruction 216 is located. Responsive to detecting the obstruction 216 along the movement pattern 202, the computing system may generate a plurality of candidate waypoints based, at least in part, on the obstruction position of the obstruction 216 along the movement pattern 202.

By way of example, the computing system may calculate a first candidate waypoint that is above the obstruction position along the vertical axis V of the three-dimensional environment 200 by adding a vertical offset to the obstruction position. The computing system may also calculate a second candidate waypoint that is closer to the POI 206 than the obstruction position along the horizontal axis H of the three-dimensional environment 200 by subtracting a horizontal offset from the obstruction position. The computing system may also calculate a third candidate waypoint that is farther from the POI 206 than the obstruction position along the horizontal axis H by adding the horizontal offset to the obstruction position. In this manner, the computing system may calculate a plurality of candidate waypoints corresponding to the obstruction position to modify the orbit shape of the movement pattern 202, thereby creating a modified movement pattern 202' that avoids the obstruction 216. It should be noted that the waypoint 218 depicted in FIG. 2 corresponds to the second candidate waypoint discussed above. The waypoint 218 is depicted in the position of the second candidate waypoint for purposes of illustration and discussion.

Furthermore, after calculating the plurality of candidate waypoints, the computing system may determine an updated orbit shape based, at least in part, on the starting position 208, at least one of the candidate waypoints (e.g., waypoint 218), and the secondary position 210. More particularly, rather than recalculating the starting position 208 and the secondary position 210 of the movement pattern 202 to avoid the obstruction 216 at the obstruction position, at least one of the candidate waypoints (e.g., waypoint 218) may be added as an additional position on the movement pattern 202, thereby creating the modified movement pattern 202'. Rather than only lerping between the starting position 208 and the secondary position 210, the modified movement pattern 202' may lerp through the starting position 208, the secondary position 210, and at least one of the candidate waypoints (e.g., waypoint 218). In this way, the obstruction 216 at the obstruction position along the movement pattern 202 may be avoided.

Referring now to FIG. 6 at (612), the computing system can determine an orbit speed for the movement pattern based, at least in part, on a distance between the camera viewpoint along the movement pattern and the POI. More particularly, responsive to determining the orbit shape for the movement pattern at (610), the computing system may determine an orbit speed based, at least in part, on how far the movement pattern is from the POI.

For instance, referring again to FIG. 2, the computing system may decrease the orbit speed of the movement pattern 202 as the distance between the camera viewpoint and the POI 206 decreases (e.g., as the camera viewpoint moves in a direction shown by arrow 212). Conversely, the computing system may increase the orbit speed of the movement pattern 202 as the distance between the camera viewpoint and the particular POI 206 increases (e.g., as the camera viewpoint moves in a direction shown by arrow 214). By dynamically altering the orbit speed in this manner, the computing system provides a smooth, stable movement pattern 202 around the POI 206.

Returning to FIG. 4 at (408), the computing system can store an association between the POI and the starting position of the movement pattern. For instance, the computing system may store an association between the POI (e.g., POI 206) and the starting position (e.g., starting position 208) of the movement pattern (e.g., movement pattern 202).

At (410), the computing system can transmit the movement pattern to a client device for display. For example, the computing system may transmit the movement pattern (e.g., movement pattern 202) to a client device (e.g., smartphone, laptop computer, mobile tablet, etc.) for display. By transmitting the movement pattern to the client device for display, the computing system may provide a user of the client device with an orbital view of the three-dimensional representation of the POI within the three-dimensional environment.

Figure 8:
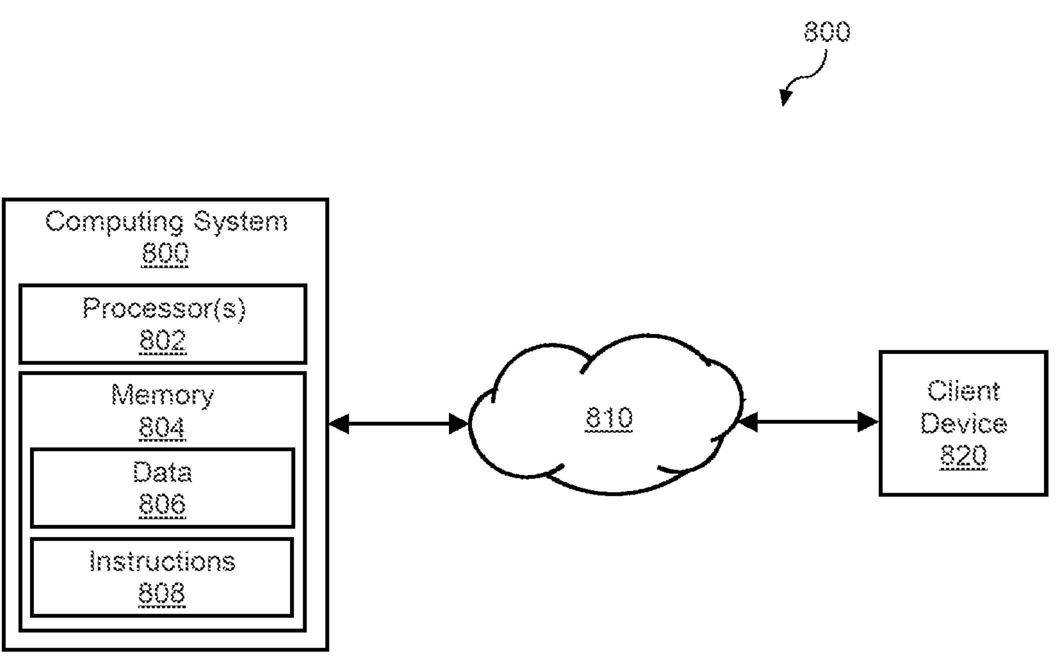
FIG. 8 depicts an example computing system according to example embodiments of the present disclosure.

FIG. 8 depicts an example computing system 800 according to example embodiments of the present disclosure. The computing system 800 may be used, for instance, to implement the method 400 of FIG. 4, the method 500 of FIG. 5, the method 600 of FIG. 6, and/or other aspects of any of the methods described herein. The computing system 800 may be communicatively coupled to a client device 820 over a network 810. More particularly, in some embodiments, the computing system 800 may communicate data (e.g., data associated with the movement pattern 202) to client device 820.

The computing system 800 includes one or more processors 802 and a memory 804. The one or more processors 802 may be any suitable processing device (e.g., a processor core, a microprocessor, an ASIC, an FPGA, a controller, a microcontroller, etc.) and may be one processor or a plurality of processors that are operatively connected. The memory 804 may include one or more non-transitory computer-readable storage medium(s), such as RAM, ROM, EEPROM, EPROM, flash memory devices, magnetic disks, etc., and combinations thereof. The one or more non-transitory computer-readable media (e.g., memory 804) may collectively store data 806. The one or more non-transitory computer-readable media (e.g., memory 804) may collectively store instructions 808 that, when executed by the processor 802, cause the computing system 800 to perform operations, such as any of the operations described herein.

In some embodiments, the computing system 800 includes or is otherwise implemented by one or more computing devices. In instances in which the computing system 800 includes plural server computing devices, such server computing devices may operate according to sequential computing architectures, parallel computing architectures, or some combination thereof.

The network 810 may be any type of communications network, such as a local area network (e.g., intranet), wide area network (e.g., Internet), or some combination thereof and can include any number of wired or wireless links. In general, communication over the network 810 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:

obtaining, by a computing system comprising one or more processor devices, a plurality of images and associated image information, each of the plurality of images depicting a same particular Point of Interest (POI), the image information being descriptive of a plurality of image characteristics for each of the plurality of images, the plurality of image characteristics comprising:

(a) geolocation characteristics indicative of geolocations at which the plurality of images were captured; and (b) interaction metrics derived from previous user interactions with the plurality of images;

selecting, by the computing system, a particular image of the plurality of images based on the image information;

determining, by the computing system, an orbit speed for a movement pattern of a camera viewpoint within a three-dimensional environment based at least in part on a distance between the camera viewpoint and the particular POI; and generating, by the computing system, the movement pattern for the camera viewpoint within the three-dimensional environment, wherein the movement pattern for the camera viewpoint moves around a three-dimensional representation of the particular POI, depicted in the particular image, within the three-dimensional environment, and wherein a starting position for the movement pattern is based, at least in part, on the geolocation at which the particular image was captured.

2. The method of claim 1, wherein each of the plurality of images comprises a result image that has previously been provided as a search result by a search service; and wherein, for each result image, the interaction metric is derived from information descriptive of historical user responses to the result image when the result image is provided as a search result by the search service.

3. The method of claim 1, further comprising:

storing, by the computing system, an association between the particular POI and the starting position of the movement pattern; and transmitting, by the computing system, the movement pattern to a client device for display.

4. The method of claim 1, wherein selecting the particular image of the plurality of images comprises:

clustering, by the computing system, each of the plurality of images to generate one or more clusters based, at least in part, on the image information; and responsive to clustering each of the plurality of images, selecting, by the computing system, a particular image in a particular cluster based, at least in part, on the image information.

5. The method of claim 4, wherein, prior to clustering each of the plurality of images, the method comprises:

for each image of the plurality of images:

determining, by the computing system, the interaction metric associated with the image is below a predetermined threshold metric; and responsive to determining the interaction metric associated with the image is below a threshold metric, filtering, by the computing system, the image from the plurality of images.

6. The method of claim 5, wherein the interaction metric associated with each image of the plurality of images is based, at least in part, on user feedback indicative of a quality of the image.

7. The method of claim 4, wherein clustering each of the plurality of images comprises:

sorting, by the computing system, each of the plurality of images into at least one cluster based, at least in part, on the geolocation at which each of the plurality of images was captured; and determining, by the computing system, a selected cluster of the one or more clusters based, at least in part, on the interaction metrics associated with one or more respective images from the one or more clusters.

8. The method of claim 7, wherein determining the selected cluster comprises:

respectively identifying, by the computing system, one or more primary images from the one or more clusters, wherein a primary image comprises an image with a highest interaction metric of the images in the cluster; and selecting, by the computing system, the selected cluster based, at least in part, on the interaction metric associated with the primary image of the cluster, the interaction metric of the primary image being higher than the interaction metric of any other primary image.

9. The method of claim 7, wherein generating the movement pattern for the camera viewpoint comprises:

calculating, by the computing system, a centroid of the selected cluster based, at least in part, on the image information associated with each image of the selected cluster;

selecting, by the computing system, the centroid of the selected cluster as an initial heading of the movement pattern; and determining, by the computing system, the starting position for the movement pattern based, at least in part, on the initial heading.

10. The method of claim 9, wherein determining the starting position for the movement pattern comprises:

determining, by the computing system, that a viewpoint associated with the initial heading comprises a full height of the particular POI; and responsive to determining the viewpoint associated with the initial heading comprises the full height of the particular POI, selecting, by the computing system, the initial heading as the starting position for the movement pattern.

11. The method of claim 9, wherein determining the starting position for the movement pattern comprises:

determining, by the computing system, that a viewpoint associated with the initial heading comprises less than a full height of the particular POI; and responsive to determining that the viewpoint associated with the initial heading comprises less than the full height of the particular POI, selecting, by the computing system, a second heading, wherein the initial heading is closer to the particular POI along a horizontal axis than the second heading.

12. The method of claim 11, wherein determining the starting position for the movement pattern further comprises:

determining, by the computing system, that a viewpoint associated with the second heading comprises the full height of the particular POI; and responsive to determining that the viewpoint associated with the second heading comprises the full height of the particular POI, selecting, by the computing system, the second heading as the starting position for the movement pattern.

13. The method of claim 11, wherein determining the starting position of the movement pattern further comprises:

detecting, by the computing system, an obstruction between the initial heading and the second heading;

responsive to detecting the obstruction, selecting, by the computing system, a third heading that is above the second heading along a vertical axis by adding a vertical offset to the second heading;

determining, by the computing system, that a viewpoint associated with the third heading comprises the full height of the particular POI; and responsive to determining the viewpoint associated with the third heading comprises the full height of the particular POI, selecting, by the computing system, the third heading as the starting position for the movement pattern.

14. The method of claim 9, wherein determining the starting position for the movement pattern comprises:

generating, by the computing system, a first raycast to a center of the particular POI from the initial heading;

selecting, by the computing system, a second heading that is above the initial heading along a vertical axis by adding a vertical offset to the initial heading;

generating, by the computing system, a second raycast to the center of the particular POI from the second heading;

determining, by the computing system, that a length of the second raycast is greater than a length of the first raycast; and responsive to determining that the length of the second raycast is greater than the length of the first raycast, selecting, by the computing system, the second heading as the starting position for the movement pattern.

15. The method of claim 9, further comprising:

determining, by the computing system, a secondary position for the movement pattern based, at least in part, on the starting position for the movement pattern;

determining, by the computing system, an orbit shape for the movement pattern based, at least in part, on the starting position and the secondary position; and determining, by the computing system, an orbit speed for the movement pattern based, at least in part, on a distance between the camera viewpoint along the movement pattern and the particular POI.

16. The method of claim 15, wherein determining the orbit shape for the movement pattern comprises:

detecting, by the computing system, an obstruction along the movement pattern between the starting position and the secondary position, wherein the obstruction is located at an obstruction position along the movement pattern;

responsive to detecting the obstruction along the movement pattern, generating, by the computing system, a plurality of candidate waypoints based, at least in part, on the obstruction position of the obstruction along the movement pattern; and determining, by the computing system, an updated orbit shape based, at least in part, on the starting position, at least one of the plurality of candidate waypoints, and the secondary position.

17. The method of claim 16, wherein generating the plurality of candidate waypoints comprises:

calculating, by the computing system, a first candidate waypoint that is above the obstruction position along a vertical axis by adding a vertical offset to the obstruction position;

calculating, by the computing system, a second candidate waypoint that is closer to the particular POI than the obstruction position along a horizontal axis by subtracting a horizontal offset from the obstruction position; and calculating, by the computing system, a third candidate waypoint that is farther from the particular POI than the obstruction position along the horizontal axis by adding the horizontal offset to the obstruction position.

18. The method of claim 15, wherein determining an orbit speed for the movement pattern comprises:

decreasing, by the computing system, the orbit speed as the distance between the camera viewpoint and the particular POI decreases; and increasing, by the computing system, the orbit speed as the distance between the camera viewpoint and the particular POI increases.

19. A computing system, comprising:

one or more processors; and one or more non-transitory computer-readable media that collectively store instructions that, when executed by the one or more processors, cause the computing system to perform operations, the operations comprising:

obtaining a plurality of images and associated image information, each of the plurality of images depicting a same particular Point of Interest (POI), the image information being descriptive of a plurality of image characteristics for each of the plurality of images, the plurality of image characteristics comprising:

(a) geolocation characteristics indicative of geolocations at which the plurality of images were captured; and (b) interaction metrics derived from previous user interactions with the plurality of images;

selecting a particular image of the plurality of images based on the image information;

determining an orbit speed for a movement pattern of a camera viewpoint within a three-dimensional environment based at least in part on a distance between the camera viewpoint and the particular POI; and generating the movement pattern for the camera viewpoint within the three-dimensional environment, wherein the movement pattern for the camera viewpoint moves around a three-dimensional representation of the particular POI, depicted in the particular image, within the three-dimensional environment, and wherein a starting position for the movement pattern is based, at least in part, on the geolocation at which the particular image was captured.

20. A non-transitory computer-readable medium comprising instructions that, when executed by one or more processors of a computing device, cause the one or more processors to perform operations, the operations comprising:

obtaining a plurality of images and associated image information, each of the plurality of images depicting a same particular Point of Interest (POI), the image information being descriptive of a plurality of image characteristics for each of the plurality of images, the plurality of image characteristics comprising:

(a) geolocation characteristics indicative of a geolocation at which an image was captured; and (b) interaction metrics derived from previous user interactions with the plurality of images;

selecting a particular image of the plurality of images from the selected cluster, based on the image information, wherein the particular image is associated with a geolocation of the geolocations;

determining an orbit speed for a movement pattern of a camera viewpoint within a three-dimensional environment, based at least in part on a distance between the camera viewpoint and the particular POI; and generating the movement pattern for the camera viewpoint within the three-dimensional environment, wherein the movement pattern for the camera viewpoint moves around a three-dimensional representation of the particular POI, depicted in the particular image, within the three-dimensional environment, and wherein a starting position for the movement pattern is based, at least in part, on the centroid of the selected cluster associated with the geolocation at which the particular image was captured.

* * * * *